Feb. 7, 1950 J. R. CARDWELL 2,496,442
DRAFT GEAR
Filed May 12, 1948 6 Sheets-Sheet 1

Inventor
James R. Cardwell
By Mann and Brown
Attys.

Feb. 7, 1950 J. R. CARDWELL 2,496,442
DRAFT GEAR
Filed May 12, 1948 6 Sheets-Sheet 2

Inventor
James R. Cardwell
By:- Mann and Brown
Attys.

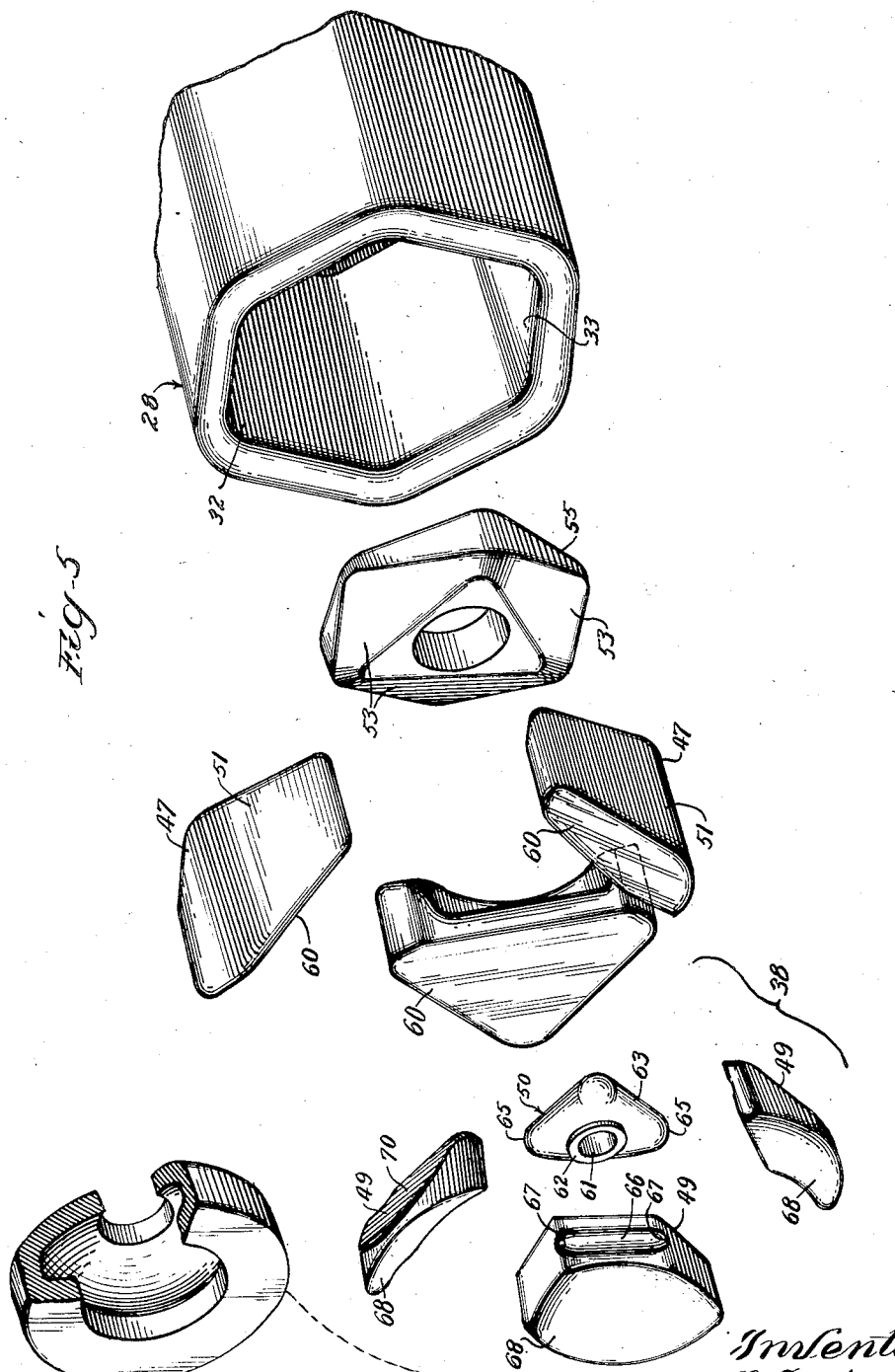

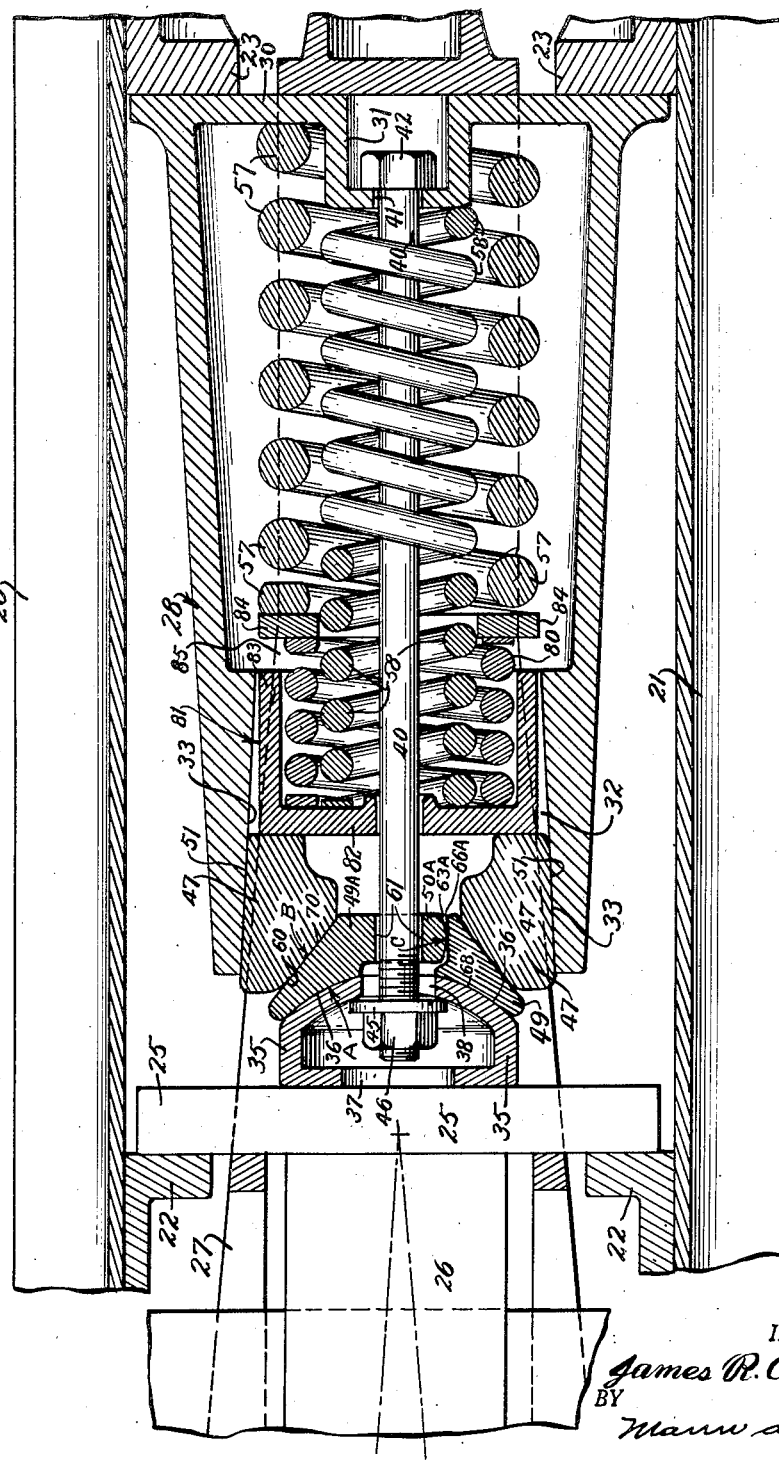

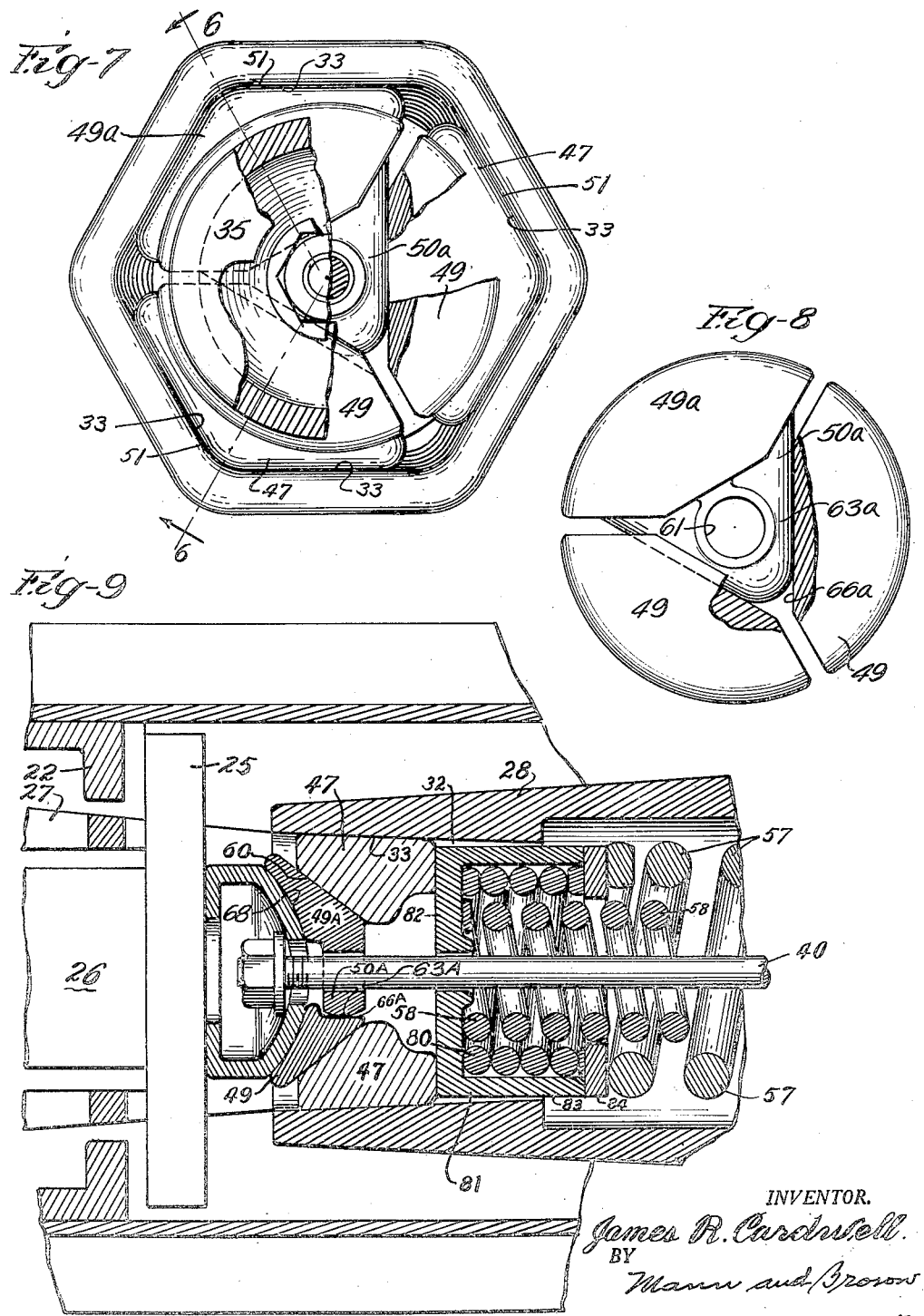

Feb. 7, 1950        J. R. CARDWELL        2,496,442
DRAFT GEAR
Filed May 12, 1948                                       6 Sheets-Sheet 6
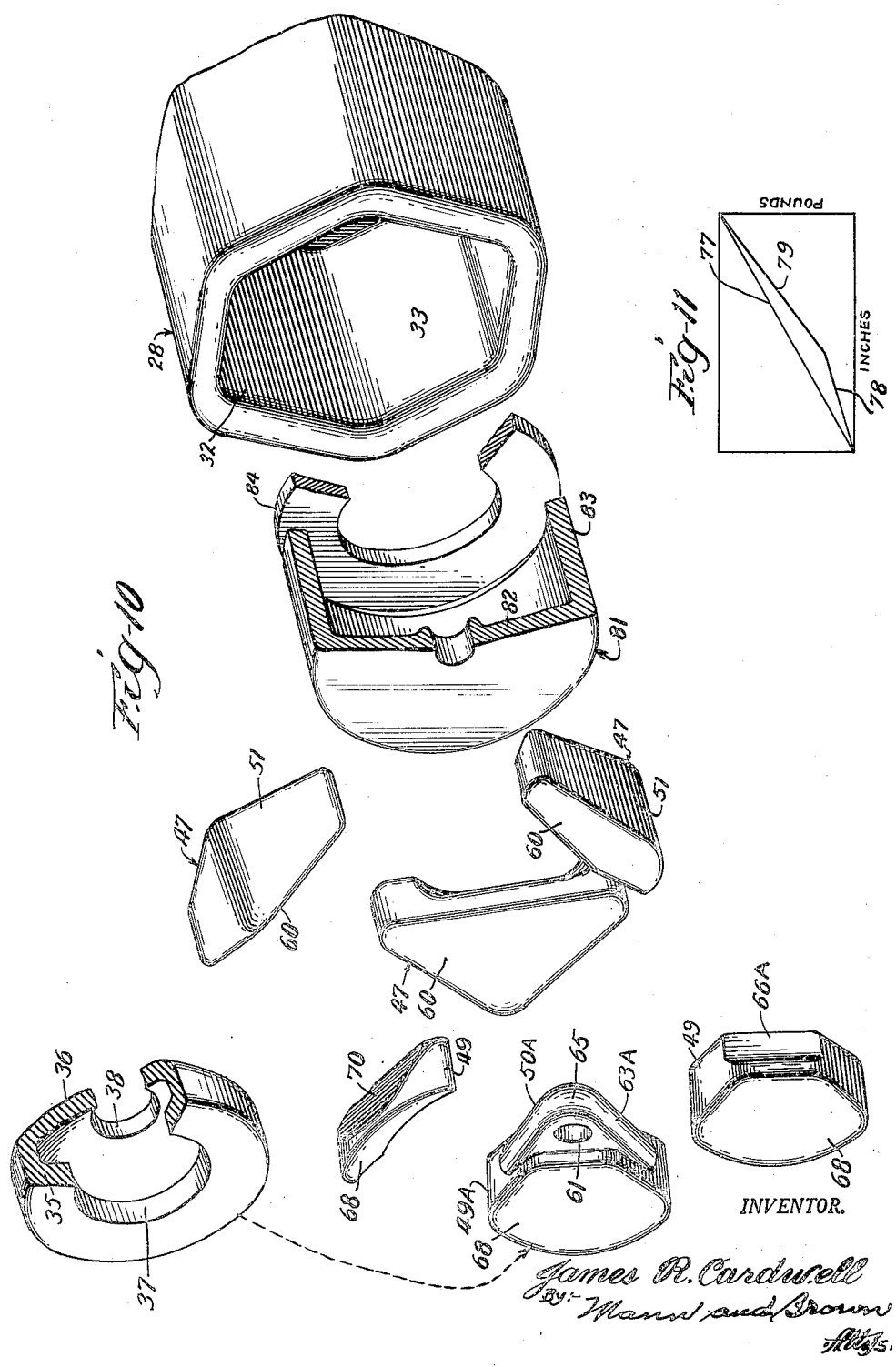
INVENTOR.
James R. Cardwell
By: Mann and Brown Patented Feb. 7, 1950

2,496,442

UNITED STATES PATENT OFFICE 2,496,442

DRAFT GEAR

James R. Cardwell, Barrington, Ill.

Application May 12, 1948, Serial No. 26,648

6 Claims. (Cl. 213—34)

My invention relates to friction draft gears for railway cars.

The general problem to which the invention is directed is that of providing a draft gear of exceptionally high load capacity; that is to say, exceptional resistance to longitudinal compression. Such high capacity may, of course, be attained by employing relatively large friction parts to provide extensive friction areas and/or by using relatively heavy springs or other yielding means. The available space in draft gear pockets, however, limits the size of the component parts of a draft gear, and, moreover, increasing the weight of a draft gear necessarily increases the cost. A further consideration is that the use of relatively heavy draft gear would be contrary to the modern trend toward decreased weight in railway cars.

High load capacity in a friction draft gear may also be achieved by employing a keen angle system of wedge and friction elements, that is to say, a system in which exceptionally high lateral pressure for frictional resistance is developed by wedge elements with abutting wedge faces at relatively flat or acute angles with respect to the longitudinal axis of the draft gear. A serious difficulty must be met, however, in that a keen angle wedging system tends to lock frictionally, and to remain locked upon decrease of the applied load, thereby making the draft gear inoperative. This difficulty is commonly referred to as the tendency of the keen angle wedge surfaces to stick together. In contrast, the usual blunt angle system of wedge and friction elements may be relied upon to release properly when the applied load is relieved, but, of course, is inherently incapable of exceptional high load resistance.

Various suggestions have been advanced heretofore for achieving in a draft gear the high resistance to load forces of a keen angle system, along with the dependable releasing action of a blunt angle system. One such approach to the general problem is to employ a system of wedge and friction elements in which some of the wedge surfaces for generating frictional pressure are at keen angles and other of the wedge surfaces serving the same purpose are at blunt angles for ready release or separation of the wedge elements in response to decrease of the applied load.

Such a hybrid system, however, usually has certain serious inherent disadvantages. In the first place, the blunt angle wedge elements as usually employed function with low efficiency for resisting loads. In the second place, since the wedge elements acting in different radial directions usually vary in efficiency, the radial pressure for frictional resistance to applied load is not uniform; that is to say, is not symmetrical with respect to the axis of the draft gear. Generally radial pressure is generated in three directions 120 degrees apart, and the substitution of blunt angle elements for acute angle elements in one of the three directions necessarily results in the generation of asymmetrical pressure. In the third place, in a hybrid system the mutual release of coacting wedge faces is not simultaneous in all radial directions, since the release action must be initiated by co-operating blunt angle elements acting in one radial direction and is in effect then transmitted to the elements that act in the other radial directions.

The general object of my invention is to provide a system of wedge and friction elements in a draft gear that has the maximum efficiency of a keen angle system and yet may be relied upon for release of the coacting wedge surfaces in response to release of load. It is contemplated that maximum pressure for frictional resistance will be attained in each of the radial directions in which the wedge members act, and that the whole organization of wedge members will release substantially simultaneously and uniformly with free separation of the coacting surfaces when the applied load is removed or reduced.

In general, my purpose is attained by employing what may be termed a collapsible cluster of keen-angle wedge members comprising a plurality of radially effective wedge members and a central core structure. In the preferred practice of my invention the cluster of wedge members is articulated in the sense that individual wedge members are adapted for rotary or pivotal movement inwardly and outwardly with respect to axis or direction of thrust.

The cluster of wedge members is part of what may be termed a pressure-transmitting, friction engagement or thrust assembly, which assembly tightens into a compact metal-to-metal keen-angle wedge structure under load, and automatically loosens with freeing of the individual wedge elements of the assembly in response to release or decrease of the applied load. Blunt angle wedge surfaces are employed in the thrust assembly but are active only under decreasing load, one object of my invention being to employ blunt angle wedge surfaces without depending on such surfaces for attaining the required friction pressure.

In the preferred practice of my invention, a further object is to provide a follower or thrust member in the above mentioned thrust assembly that responds to changes in the angle of the car coupler without interference with its primary function in the thrust assembly. This responsiveness eliminates the wear on parts that usually results from coupler oscillation.

It is a characteristic of high capacity draft gears that they offer great frictional resistance to travel under applied load of thrust or buff, and that the applications of load are transmitted to the car harshly, especially near the end of a train. Another object of this invention is to provide for a relatively soft or easy preliminary travel upon the application of load to thereby eliminate the harshness characteristic of the past.

The above and other objects and advantages of my invention will be apparent in the following detailed description taken in connection with the accompanying drawings.

In the drawings, which are to be regarded as merely illustrative:

Fig. 5 is an exploded view of cooperating parts of the draft gear;

Fig. 6 is a longitudinal section corresponding to Fig. 1 through a draft gear having an improved cluster of wedge members and an arrangement for providing an easy or soft preliminary travel;

Figs. 7 and 8 are end views corresponding to Figs. 2 and 3 of the improved draft gear shown in Fig. 6;

Fig. 9 is a fragmentary view corresponding to Fig. 6 showing the draft gear after the preliminary travel, or partly compressed;

Fig. 10 is an exploded view of the parts assembled in Fig. 6; and

Fig. 11 is a diagram comparing the characteristic curve of a high compression draft gear with the curve of the draft gear shown in Figs. 6 and 9.

Figure 1:
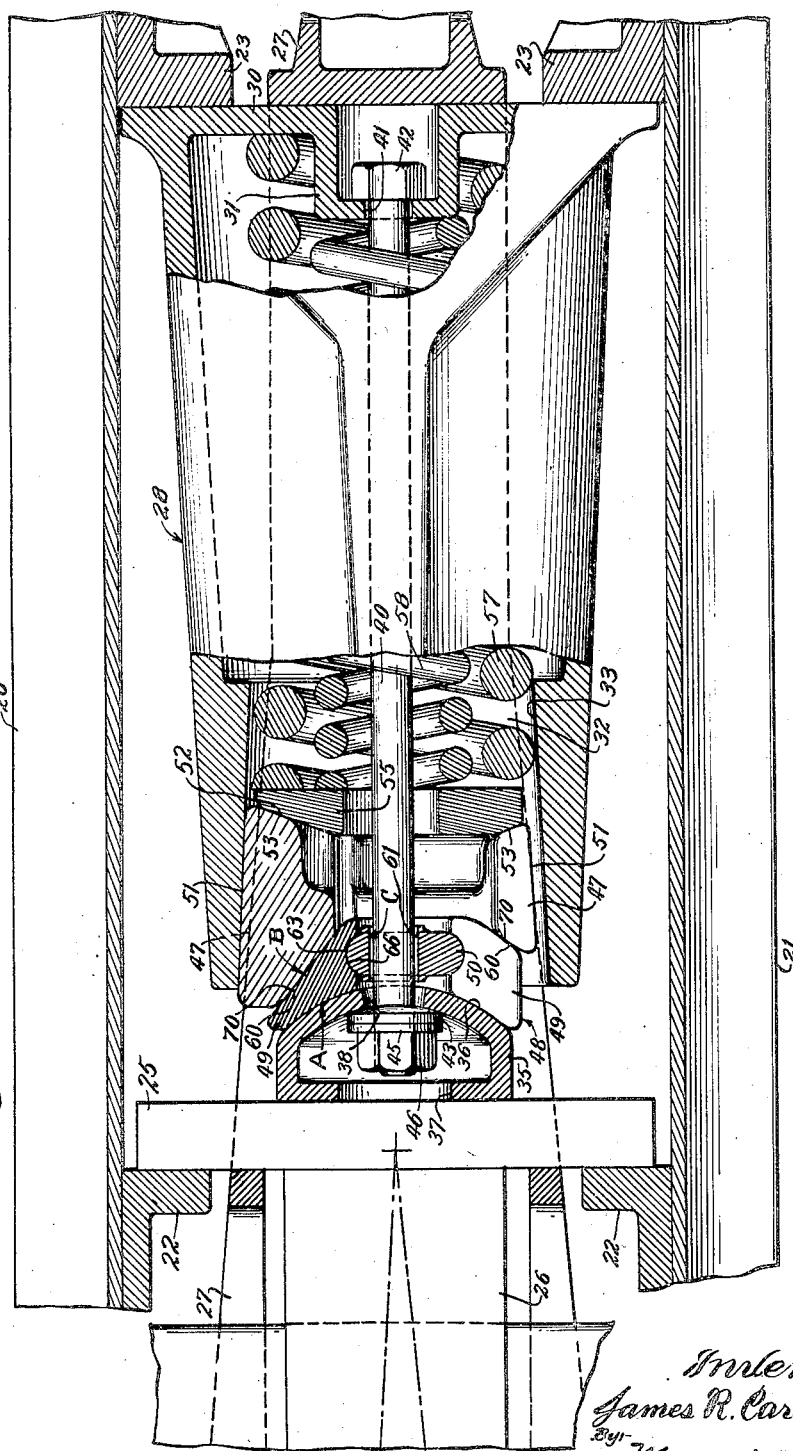
Fig. 1 is a longitudinal section through a draft gear pocket, showing one embodiment of my draft gear, parts being broken away to reveal the internal structure.
Figure 2:
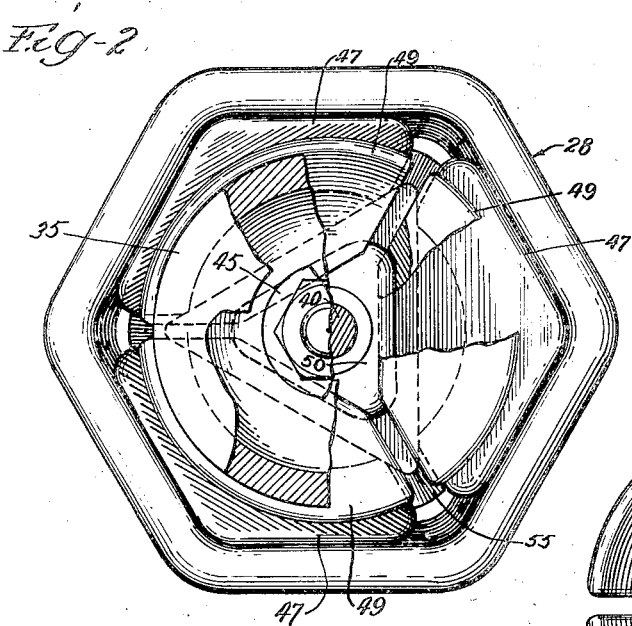
Fig. 2 is an end view of the draft gear, with parts broken away.
Figure 3:
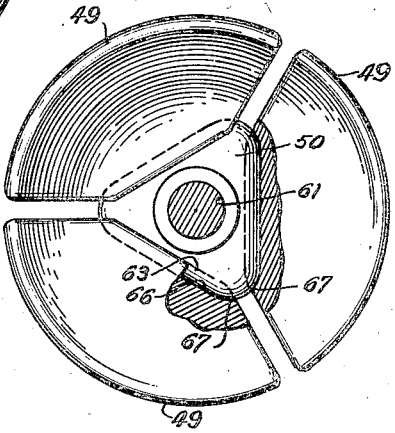
Fig. 3 is a face view, or view in elevation, of the cluster of wedge members employed in the draft gear.

In the drawings, numerals 20 and 21 designate the center sills of a railway car, on which sills are mounted draft lugs 22 and buff lugs 23. The rectangular space defined by the two sills and the four lugs constitutes the pocket in which the draft gear is mounted. In accord with common practice, a follower, in the form of a plate 25, is inserted between the draft lugs 22 and the draft gear, this plate being in contact with the butt of the coupler 26. The draft gear is embraced by a draft yoke 27, which draft yoke is connected to the coupler 26 in a well known manner.

The draft gear shown in Fig. 1 has a housing, generally designated 28, that is open at one end and is closed at the other end by a base wall 30, the base wall being offset to form an inwardly extending boss 31. Near its open end, the housing 28 forms a friction chamber 32 providing a friction surface or surfaces 33. Preferably the friction chamber 32 is of longitudinal tapering configuration, the walls that provide the friction surface 33 converging inwardly in longitudinal section as views in Fig. 1. Rather than make the friction chamber 32 circular in cross-section, I prefer to employ a polygonal configuration, the particular friction chamber shown in Figs. 1 to 4 being hexagonal.

At the open end of the friction chamber 32 is a follower or thrust member 35 in contact with the previously mentioned follower plate 25. It is contemplated that the thrust member 35 will have a convex inner face 36, —in this instance, shaped as the segment of a sphere. The convexity of the inner face is required for a certain wedging effect, and the spherical configuration is preferred to make the follower movable universally to conform automatically with changes in the angularity of the follower plate 25 as the coupler 26 swings to various angles relative to the longitudinal axis of the car. The self-aligning thrust member 35, in maintaining constant face-to-face contact with the follower plate 25, avoids such wear as would be caused by relative movement between the thrust member and the follower plate. Preferably, the thrust member 35 is of hollow construction, with a relatively large central aperture 37 on its outer wall and a smaller aperture 38 on its inner wall.

The draft gear is provided with the usual longitudinal restraining means in the form of an axially positioned bolt 40 extending from the base wall 30 of the draft gear casing to the thrust member 35. The bolt extends through an aperture 41 in the base wall boss 31, with the head 42 of the bolt inside the boss; and at the other end the bolt extends through the aperture 38 of the thrust member 35, the aperture 38 being sufficiently oversize with respect to the bolt to permit the required universal movement of the thrust member. Inside the thrust member 35 a suitable temporary washer 43, of lead or other frangible material, may be mounted on the bolt 40 along with a permanent metal washer 45, the two washers being retained by the usual nut 46. The purpose of the temporary washer 43 is to hold the draft gear initially in sufficiently contracted state to permit the draft gear to be installed in the draft gear pocket. Immediately after installation the temporary washer 43 is ruptured by load forces and drops away to permit the draft gear to expand to the full length of the pocket.

As heretofore indicated, the present invention involves the novel combination of radially expansile means for frictional engagement with the tapered surface 33, together with an articulated cluster of wedge members to expand the radially expansile means in response to inward movement of the thrust member 35, the expansion action involving mutually abutting wedge faces inclined substantially less than 45 degrees relative to the longitudinal axis of the draft gear. In Figs. 1 to 3 and 5, the radial expansile means comprises a set of friction shoes 47, and the articulated cluster, generally designated 48, comprises a set of wedge members 49 together with a central annular core structure, which structure, in this instance, is a separate, one-piece core 50.

In Figs. 1 to 3 and 5, there are three friction shoes 47 aligned with three alternate vertices of the hexagonal configuration of the friction chamber 32, each of the friction shoes having a longitudinal face 51 of angular cross-sectional configuration to conform to two adjacent sides of the hexagonal configuration for intimate frictional contact with the friction surfaces 33 of the friction chamber. Each of the friction shoes 47 has an inner wedge face 52 at the right in Fig. 1, to coact with a corresponding wedge face 53 of an annular follower 55, the follower having three such faces (Fig. 5). In a well known manner, the follower 55 is continuously urged against the friction shoes 47, with considerable pressure, by virtue of a plurality of helical springs acting in compression between the follower and the base wall 30 of the draft gear housing. The drawings show a relatively heavy outer spring 57 and a lighter inner spring 58, the inner spring seating against the base wall boss 31.

Each of the friction shoes 47 is also formed with an outer wedge face 60 inclined at a relatively low angle with respect to the longitudinal axis of the draft gear for wedging cooperation with the articulated cluster. In this instance, the low angle is approximately 39 degrees.

With reference to the cluster of wedge members, there are preferably three wedge members 49 corresponding to and matched with the three friction shoes 47, and the three wedge members are pivotally related to the core 50. The pivotal relationship may be provided in a simple manner by shaping the wedge members and the core with cooperating curved surfaces.

The core structure 50 has an axial bore 61 substantially larger in diameter than the bolt 40, and is triangular in general configuration. The three sides of the core structure are shaped to form three cylindrically curved contact surfaces 63 for the three wedge members 49, respectively, the three curved contact surfaces merging at their junctures to form three rounded corners 65 of the core structure.

Each of the three wedge members 49 is formed with a cylindrically curved groove 66 complementary to the corresponding curved contact surface 63 of the core structure 50, the groove portion of the wedge member being in sliding contact with the core for pivotal movement of the wedge block about the axis of curvature common to the mutually contacting surfaces. Each of the wedge members 49 is formed with a rounded shoulder 67 at each end of its groove 66, for sufficient engagement with two of the rounded corners 65 of the core structure 50 to hold the wedge member in its proper spaced relationship to the other two wedge members, each of the wedge members in effect engaging the core structure from two sides.

As best shown in Fig 5, each of the wedge members 49 has an outer space 68 of spherical configuration to match the spherically shaped inner face 36 of the thrust member 35. The general slope of the outer face 68 relative to the longitudinal axis is relatively blunt for ready separation of the parts, the mean tangent angle in this instance being approximately 50 degrees. The inner face 70 of each wedge member 49 matches the corresponding outer wedge face 60 of the corresponding friction shoe 47, and is therefore at the same angle of approximately 39 degrees from the axis of the draft gear.

It will be noted that the two wedge faces 68 and 70 of each of the wedge members 49 diverge inwardly, because of the difference in the two angles, and therefore when the wedge members are squeezed between the thrust member 35 and the friction shoes 47, in response to applied loads, the wedge members tend to be shifted radially inwardly by wedging action toward the abutting central core structure 50.

Upon axial compression of the draft gear under applied load, the parts of the thrust assembly, viz:—the thrust member 35 and the cluster of wedge members comprising the three wedge members 49 and the core structure 50, all tighten together into a compact metal wedge for pressure transmission to the three friction shoes 47. Because of the keen angles at which the thrust assembly transmits pressure to the friction shoes 47, the radially outward pressure against the friction shoes is exceptionally high and the radial pressure is increased to tremendous magnitudes by the inward crowding of the friction shoes 47 as they are forced longitudinally along the tapered friction wall 33 of the friction chamber 32.

Upon release or reduction of the load applied to the draft gear, the reverse action occurs, the arch supported by the thrust member 35 collapses, and the parts of the thrust assembly are forced to withdraw by the action of the draft gear springs on the friction shoes 47. The initial retraction causes the thrust assembly to loosen in a manner that breaks any adherence between coacting wedge surfaces.

It will be noted that the axes of pivotal action of the three wedge members 49 are offset radially inward, as well as longitudinally inward, from the pressure centers of contact between the three wedge members 49 and the thrust member 35, and are offset in similar manner from the pressure centers of the areas of contact between the wedge members and the friction shoes 47. Thus, the pressure center A in Fig. 1 and the pressure center B are both positioned a substantial distance radially outward, and a substantial distance longitudinally outward, from the axis C about which the corresponding wedge member 49 tends to pivot (Fig. 1). It is apparent that upon release of the draft gear from load the force directed by the draft gear springs 57 and 58 toward the three pressure centers B tend to collapse the wedge cluster, and thus tend to rotate the keen angle faces of the wedge members 49 out of adherence to the keen angle faces of the friction shoes 47. It is a well known fact that it is easier to rotate one object out of face-to-face adherence to another object, for example, by prying one edge of the clinging object, than to lift the clinging object bodily with straight line motion from its position of adherence.

Any minute relative movement of the thrust member 35 away from the three wedge members 49 creates clearance for rotation of the three wedge members 49, and any clearance for rotation of the wedge members that tends to form will occur between the wedge members and the thrust member rather than between the wedge members and the friction shoes.

In effect, the thrust assembly, together with the friction shoes 47, functions as an arch which tightens under load to create lateral pressure. Elements of the arch other than the thrust member 35 provide pairs of keen angle wedge faces in mutual contact for high multiplication of the applied force, but the thrust member itself, corresponding to the keystone of the arch, has only blunt angle faces and therefore may be readily retracted to break the arch with consequent instant loosening of the whole organization.

The organization differs from a simple arch, however, because of the addition of the core 50. The core 50 in effect shares with the keystone, i. e., the thrust member 35, the function of spanning a central gap in the arch. The wedge members 49, by virtue of their shape, tend to shift radially inward rather than outward when the arch is under load, but the core serves as a spacer for the wedge members 49 and blocks any such tendency for inward movement. Thus the core 50 prevents wedging action at the blunt angle faces of the thrust member and causes all of the wedging action to occur at the more efficient keen angle faces of the arch. In the meantime, the thrust member, advancing under load, prevents inward rotation of the wedge members 49.

Upon retraction of the thrust member 35 in response to decrease in the applied load, the thrust member, by virtue of its blunt angle faces, tends to free the wedge members 49 for collapse or rotation inward about the core 50, and at the same time the retraction of the thrust member results automatically in the creation of positive turning moments to cause such collapse. The turning moments have been explained in the location of the centers of pressure on the wedge members 49 relative to the pivot axes provided by the core 50. Thus, with the active cooperation with the thrust member under increasing load, the wedge cluster is a stable unit in the arch structure, but is instantly unstable when the active cooperation is withdrawn with decrease in the load. By virtue of its spherical curved inner face 36 the thrust member 35 functions effectively in the thrust assembly at any position to which it may rotate in conforming to the oscillations of the follower plate 25 and coupler 26.

Figure 4:
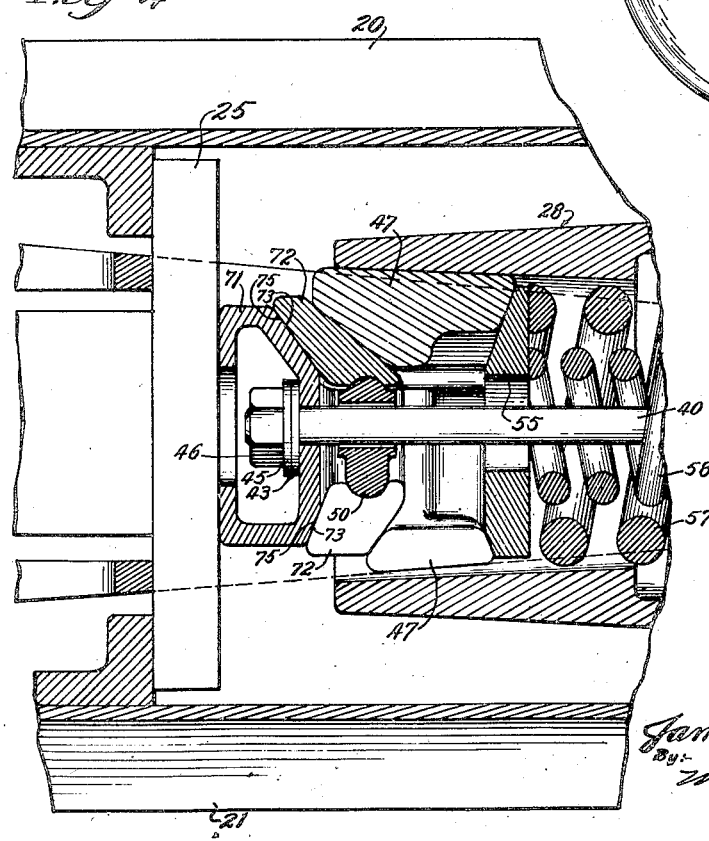
Fig. 4 is a fragmentary longitudinal sectional view indicating how the structure of Fig. 1 may be modified.

Fig. 4 indicates how the described draft gear may be modified by substituting a thrust member 71 for the previously described thrust member 35, and substituting three wedge members 72 for the previously mentioned wedge members 49, the remainder of the draft gear structure being the same as heretofore described. The thrust member 71 differs from the original thrust member only in having three flat faces 73 instead of a spherical face for cooperation with the wedge members. The wedge members 72 have flat faces 75 corresponding to the flat faces 73 for intimate contact therewith.

Whereas in the form shown in Figs. 1 to 3 and 5, the articulated cluster included three wedge members 49 and a core structure 50, in the form shown in Figs. 6 to 10, one of the wedge members designated 49A is made in one with or integral with the core structure designated 50A, the other wedge members 49 being free and articulated to the wedge member 49A and the core.

Instead of the cylindrical curve contact surfaces 63 on the core member 50 and the corresponding grooves 66 on the wedge members 49, the core member 50A is provided with cylindrical contact surfaces 63A having rolling contact with generally flat surfaces 66A on the two wedge members 49. This arrangement makes for freer rotary movement of the wedge members and facilitates the collapsing of the thrust assembly made up of the thrust member 35, the three articulated wedge members 49 and 49A, and the core structure 50A. Corresponding improvement will be readily made in the form shown in Figs. 1 through 5.

Outwardly of the generally flat surfaces 66A having rolling contact with the cylindrical surfaces 63A, the wedge members 49 are extended radially inward to provide appropriate spherical surfaces 68 for cooperation with the spherical surface 36 of the thrust member 35.

The shoulders 67 at the end of each groove 66 for cooperation with the rounded corners 65 of the core structure 50, as described in connection with Figs. 1 through 5, may well be dispensed with, and nothing to correspond is included in the structure shown in Figs. 6 to 10, for the articulated wedge members are inherently held in position by the form and relation of the parts, beginning with the spherical surface 36 on the thrust member 35 and extending through to the friction surfaces 33 of the polygonal friction chamber 32.

If the inches of travel of a high compression draft gear should be plotted as abscissas and the pounds of pressure as ordinates, the characteristic curve would be roughly the same as the line 77 (Fig. 11)—the initial compression and corresponding effects being ignored.

According to one feature of this invention, that curve is modified by introducing a preliminary travel corresponding to the line 78 followed by further travel corresponding to the line 79 plotted in substantially the same way as 77. The effect of this is to permit a comparatively low resistance to preliminary travel of the draft gear under a compression of applied load to soften the effect on the car and eliminate the sharpness indicated by the line 77. Thereafter the travel is indicated by the line 79, and the result may be that the draft gear will have the same capacity if that is desired.

A simple embodiment for this purpose and achieving that desirable result is shown in Figs. 6, 9, and 10.

The inner spring 58 may be assumed to be the same as shown in Fig. 1, but the outer spring 57 is shortened and redesigned, and there is added a preliminary travel spring 80.

The follower 52 has been omitted and replaced by a stepped follower 81 comprising a disk portion 82 receiving the thrust of the outer ends of the inner spring 58 and the preliminary travel spring 80 and an outer flange or rim portion 83 surrounding the preliminary spring portion 80. Between the free end of that rim portion 83 and the adjacent end of the outer spring 57, there is an inner spring seat or auxiliary follower 84 of sufficient depth to extend between the adjacent ends of the preliminary travel spring 80 and the outer spring 57 substantially as shown in Figs. 6 and 9.

The rim portion 83 of the stepped follower 81 is normally spaced from the auxiliary follower 84, as indicated at 85, to permit preliminary travel of the draft gear while compressing the preliminary travel spring 80 and before effectively compressing the outer spring 57. For instance, in a high capacity draft gear having a 2⅝" total travel, the preliminary travel might be on the order of ¾".

The result would be that, upon initial compression of the draft gear upon applied load, the inward movement or travel of the friction members 47 would be resisted by the preliminary travel spring 80 and the inner spring 58, if any, during this preliminary travel of ¾", and the friction developed between the outer friction surfaces 51 of the wedge members 47 and the inner friction surfaces 33 of the friction chamber 32 would be relatively low as compared with the draft gear shown in Fig. 1. Hence, there would be a preliminary travel having the characteristics of easiness or softness. At the end of that travel, the rim portion 83 of the follower 81 would close against the spring seat 84, and further travel would be resisted additionally by the heavy outer spring 57, with the consequence that the friction between the wedge members 47 and the casing 28 would be enormously increased and the capacity of the draft gear thus developed.

This manner of illustrating the improved preliminary travel feature of a high capacity draft gear is selected because of the minimum change required in conventional practice, but it is not intended to thereby impose an unnecessary limitation. Other forms will be readily designed.

This feature is a valuable accompaniment of the feature characterized by the novel thrust assembly which so readily collapses to release the parts upon release of the load, but it is also valuable in connection with other forms of high capacity draft gear.

This application is a continuation-in-part of my copending application Ser. No. 681,353, now abandoned, filed July 3, 1946.

I claim:

1. Shock absorbing apparatus for a draft gear, comprising a casing forming a friction chamber, means to frictionally engage the interior of said chamber in response to loads applied to the draft gear, said engagement means including a plurality of wedge members movable longitudinally of said chamber, arranged around the longitudinal axis of the chamber, and articulated by a central apertured core spacing said wedge members from each other, said core providing surfaces in rolling contact with adjacent wedge members for pivotal movement of the individual wedge members inwardly and outwardly relative to said axis, thrust means for transmitting load forces to said individual wedge members, yielding means to resist the load-responsive longitudinal movement of said plurality of wedge members, and a locating bolt extending substantially completely through said apparatus for retaining the latter in assembled condition.

2. Shock absorbing apparatus for a draft gear, comprising a casing forming a friction chamber, means to frictionally engage the interior of said chamber in response to loads applied to the draft gear, said engagement means including a plurality of wedge members movable longitudinally of said chamber, arranged around the longitudinal axis of the chamber, and articulated by a central apertured core spacing said wedge members from each other, said core providing surfaces in rolling contact with adjacent wedge members for pivotal movement of the individual wedge members inwardly and outwardly relative to said axis, thrust means for transmitting load forces to said individual wedge members, yielding means to resist the load-responsive longitudinal movement of said plurality of wedge members, a follower interposed between said yielding means and said engagement means and having radially inclined surfaces in contact with the latter, and a locating bolt extending substantially completely through said apparatus for retaining the latter in assembled condition.

3. Shock absorbing apparatus for a draft gear, comprising a casing forming a friction chamber, means to frictionally engage the interior of said chamber in response to loads applied to the draft gear, said engagement means including a plurality of wedge members movable longitudinally of said chamber, arranged around the longitudinal axis of the chamber, and articulated by a central apertured core spacing said wedge members from each other, said core providing surfaces in rolling contact with adjacent wedge members for pivotal movement of the individual wedge members inwardly and outwardly relative to said axis, a thrust member having a substantially convex thrust surface adapted to transmit load forces to said individual wedge members, yielding means to resist the load-responsive longitudinal movement of said plurality of wedge members, and a locating bolt extending substantially completely through said apparatus for retaining the latter in assembled condition.

4. Shock absorbing apparatus for a draft gear, comprising a casing forming a friction chamber, means to frictionally engage the interior of said chamber in response to loads applied to the draft gear, said engagement means including a plurality of wedge members movable longitudinally of said chamber, arranged around the longitudinal axis of the chamber, and articulated by a central apertured core spacing said wedge members from each other, said core providing surfaces in rolling contact with adjacent wedge members for pivotal movement of the individual wedge members inwardly and outwardly relative to said axis, thrust means for transmitting load forces to said individual wedge members, yielding means to resist the load-responsive longitudinal movement of said plurality of wedge members, and a locating bolt extending substantially completely through said apparatus for retaining the latter in assembled condition, said central apertured core being integral with one of the wedge members.

5. Shock absorbing apparatus for a draft gear, comprising a casing forming a friction chamber, means to frictionally engage the interior of said chamber in response to loads applied to the draft gear, said engagement means including a plurality of wedge members movable longitudinally of said chamber, arranged around the longitudinal axis of the chamber, and articulated by a central apertured core spacing said wedge members from each other, said core and adjacent wedge members providing mating surfaces in rolling contact for pivotal movement of the individual wedge members inwardly and outwardly relative to said axis, and with one of each pair of mating surfaces having a curved cross section and the other having a substantially less curved cross section to avoid binding, thrust means for transmitting load forces to said individual wedge members, yielding means to resist the load-responsive, longitudinal movement of said plurality of wedge members, and a locating bolt extending substantially completely through said apparatus for retaining the latter in assembled condition.

6. For use in a device of the class described, a wedge member of generally triangular shape having a spherically concave upper surface, a pressure-transmitting outer surface, a lateral substantially vertical surface for making at least line contact with the corresponding surface of a juxtaposed wedge member, and a radially inward, substantially vertical surface for making at least line contact with the mating surface of a centrally apertured core.

JAMES R. CARDWELL.

No references cited.